United States Patent [19]

Sermon

[11] 4,228,138
[45] Oct. 14, 1980

[54] CATALYSIS

[75] Inventor: Paul A. Sermon, Cowley, England

[73] Assignee: Johnson, Matthey & Co., Limited, London, England

[21] Appl. No.: 872,589

[22] Filed: Jan. 25, 1978

Related U.S. Application Data

[63] Continuation-in-part of Ser. No. 740,172, Nov. 9, 1976, Pat. No. 4,088,604, which is a continuation of Ser. No. 553,308, Feb. 26, 1975, abandoned.

[30] Foreign Application Priority Data

Mar. 6, 1974 [GB] United Kingdom ............ 10063/74

[51] Int. Cl.² .......................................... B01D 53/34
[52] U.S. Cl. ............................ 423/239; 423/213.5; 423/351; 423/594
[58] Field of Search ............... 423/239, 213.2, 213.5, 423/212, 210, 351, 594

[56] References Cited

U.S. PATENT DOCUMENTS

| | | | |
|---|---|---|---|
| 3,410,651 | 11/1968 | Brandenburg et al. | 423/213.2 |
| 3,686,374 | 8/1972 | Dean et al. | 260/680 E |
| 3,773,894 | 11/1973 | Bernstein et al. | 423/213.5 |
| 3,839,224 | 10/1974 | Yonehara et al. | 423/213.2 X |
| 3,883,444 | 5/1975 | Maselli et al. | 423/215.5 |
| 3,888,792 | 6/1975 | Hughes | 252/462 |
| 3,923,696 | 12/1975 | Chart et al. | 252/472 |
| 3,953,575 | 4/1976 | Gidaspow et al. | 423/239 |
| 3,957,691 | 5/1976 | Adachi et al. | 423/213.5 X |

FOREIGN PATENT DOCUMENTS 49-123174  11/1974  Japan ..................................... 423/239

*Primary Examiner*—Earl C. Thomas
*Attorney, Agent, or Firm*—Cushman, Darby & Cushman

[57] ABSTRACT

This invention relates to the purification of air and other gaseous media. In particular the invention is concerned with the decomposition of one or more of the oxides of nitrogen which may be present in a gas stream also containing gaseous compounds such as carbon monoxide and hydrocarbons. In certain cases, the gas stream may contain a stoichiometric excess of oxygen or an oxidizing agent.

The catalyst used in the process of the invention is a mixed oxide of iron and cobalt selected from the group consisting of (a) $Co^{II}_x Fe^{II}_{1-x} Fe^{III}_2 O_4$ where x normally has values $0 \leq x \leq 1$ and, (b) $Co^{II} Co^{III}_{(x-1)} Fe^{III}_{(3-x)} O_4$ where x normally has values $1 \leq x \leq 3$.

10 Claims, 3 Drawing Figures

COMPOSITION OF COBALT–IRON OXIDE ($x$ in $Co_x Fe_{3-x} O_4$)
BET surface area as a function of cobalt-iron oxide composition (hydroxide preparation)

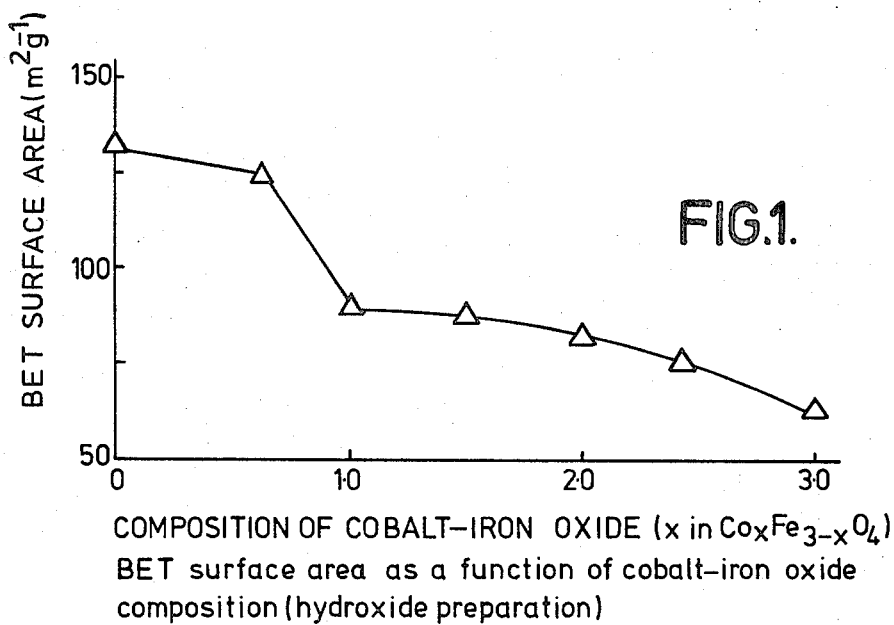
BET surface area as a function of cobalt-iron oxide composition (hydroxide preparation)
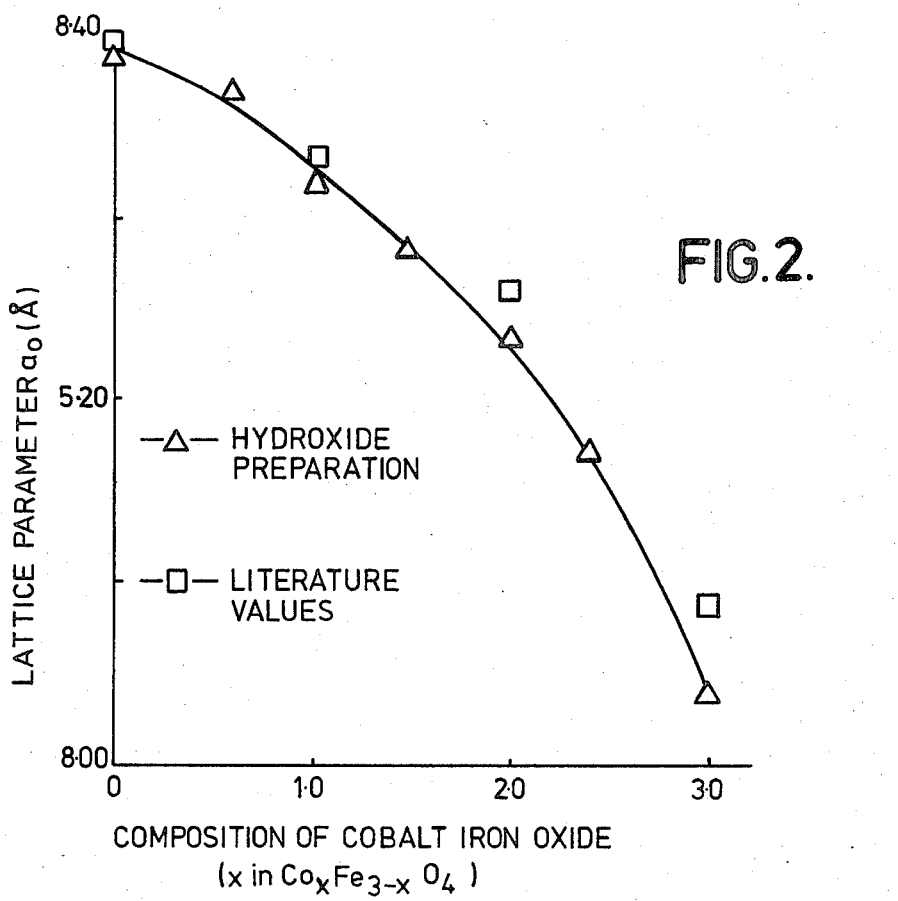
Variation of lattice parameter with cobalt-iron oxide composition.

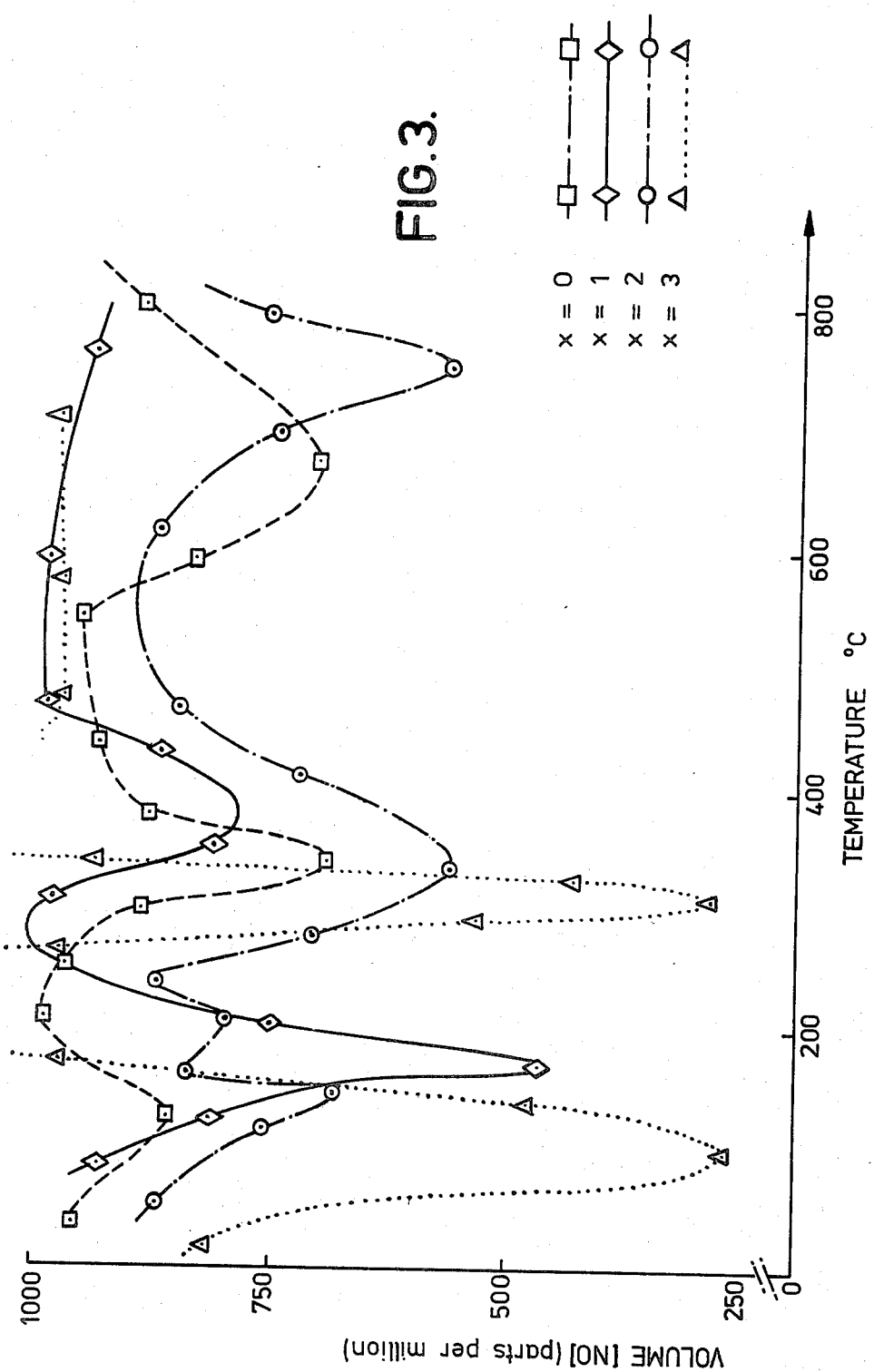

CATALYSIS

This application is a continuation-in-part of Ser. No. 740,172, filed Nov. 9, 1976, now U.S. Pat. No. 4,088,604, said Ser. No. 740,172 being itself a continuation of Ser. No. 553,308, filed Feb. 26, 1975, now abandoned.

This invention relates to the purification of air and other gaseous media. More particularly, the invention relates to the decomposition of one or more of the oxides of nitrogen, which may be present in a gas stream also containing gaseous compounds such as carbon monoxide and hydrocarbons and, in certain cases, the gas stream may contain a stoichiometric excess of oxygen or an oxidizing agent.

U.S. Pat. No. 3,410,651 relates to the treatment of exhaust gases from internal combustion engines and describes a catalyst system comprising a substrate having a film or layer of alumina formed thereon and, deposited on the alumina, a chromium compound capable of reacting with lead or lead compounds present in the exhaust gases. The resulting reaction products are retained on the alumina and act as oxidation catalysts. The exhaust gases are then reacted with a second oxidation catalyst to complete the oxidation of the combustible compounds. The second catalyst preferably comprises vanadium oxide or copper chromite, although salts or compounds of, for example, silver, zinc, chromium, manganese, cobalt, tungsten, nickel, platinum and iron, and combinations thereof, may be used.

U.S. Pat. No. 3,686,347 describes the use of metal ferrites as oxidative dehydrogenation catalysts. The ferrites, having the formula $MeFe_2O_4$ where Me represents a divalent metal ion having an ionic radius between 0.5 and 1.1 Å, are prepared preferably in an oxygen-deficient atmosphere, more preferably still in an inert atmosphere. The resulting catalysts are said to be particularly active for the oxidative dehydrogenation, in the presence of excess oxygen, of organic compounds generally containing up to 20 carbon atoms, especially where the desired product is a vinylidene compound.

U.S. Pat. No. 3,773,894 describes an automotive exhaust gas treatment in which the gases are contacted under net reducing conditions with a catalyst comprising a metallic reinforcing member and a catalytically-active surface layer of about 40-95 wt % nickel and about 5-60 wt % copper. Commercial "Monel" alloys sold by International Nickel Company have suitable catalytic properties.

U.S. Pat. No. 3,839,224 discloses an oxidation catalyst for purifying internal combustion engine exhaust gases and comprising a refractory support carrying a first deposit of activated alumina and a second deposit of activated alumina and a second deposit of at least one heavy metal oxide.

U.S. Pat. No. 3,883,444 describes a catalyst comprising cobalt oxide promoted with palladium and optionally containing an oxide of nickel, the catalyst being supported on spinel (magnesium aluminate) or mullite. The catalyst is stated to be useful for purifying internal combustion engine exhaust gases.

U.S. Pat. No. 3,923,696 describes a catalyst comprising a metal or a metal oxide, preferably of a Group VIII metal, or an alloy or mixture thereof with one or more of copper, chromium, vanadium, zinc, molybdenum, tungsten and the like. supported on a metallic substrate and having a layer of chromium oxide between the substrate and the catalytic layer. The purpose of the chromium oxide layer purports to inhibit reaction between the substrate and oxygen, nitrogen, NOx and carbonaceous products produced for example, by incomplete combustion of hydrocarbon fuels.

In contrast with the several prior patents to which brief reference has been made, the present invention provides a process for the purification of air, for example, the decomposition of one or more oxides of nitrogen, and includes the step of contacting the air or other gaseous media with a catalyst comprising a mixed oxide of iron and cobalt selected from the group consisting of:

(a) $Co_x^{II}Fe_{1-x}^{II}Fe_2^{III}O_4$ where x normally has values $0 \leq x \leq 1$, and (b) $Co^{II}Co_{x-1}^{III}Fe_{3-x}^{III}O_4$ where x normally has values $1 \leq x \leq 3$.

Suitable nominal values of x for type (a) are 0, 0.5 and 1 and for type (b) are 1, 2 and 3.

The mixed oxides generally have the spinel structure. The compositions of the above types are not necessarily stoichiometric compounds and consequently the value of x may vary without greatly altering the structure or properties of the composition. It often happens that, for a certain nominal value of x, the actual value of x as determined experimentally varies somewhat. Furthermore, in some compositions of the above types as prepared, free $Fe_2O_3$ or $Co_3O_4$ is present.

The mixed oxide catalyst of the invention may be used either in the supported or unsupported form. If supported, the support may be, for example, an inert unitary porous refractory ceramic honeycomb, although the support may equally be a ceramic material in the form of pellets, powder granules, monoliths, spherules, powder shaped extrudates or, for example, a corrugated or extended metallic substrate or nichrome wire. Where a wire support is used, the wire may be woven or may be a pad of randomly oriented wires of the same or differing lengths.

Suitable materials which may be used to constitute a ceramic support are zircon-mullite, mullite, alumina, sillimanite, silica, magnesium silicates, kaolin clays, zircon, petalite, spodumene, cordierite, and most aluminosilicates.

Proprietary products which may be used for the supports are described in U.S. Pat. Nos. 3,397,154 and 3,498,927 and British Pat. No. 882,484. Examples of such products are:

"TORVEX", a mullite honeycomb having eight corrugations per inch and an alumina washcoat; "THERMACOMB", a cordierite honeycomb supplied by the American Lava Corporation, and EX 20, a cordierite honeycomb supplied by Corning Glass.

Suitable corrugated or extended metallic substrates which may also be used as supports are such as those disclosed in German DOS No. 2450664.

One particular extended metal substrate is an oxidation resistant alloy of iron including at least one of the elements 3-40% by weight chromium, 1-10% by weight aluminium, a trace to 5% by weight cobalt, a trace to 72% by weight nickel and a trace to 0.5% by weight carbon. Another suitable extended metal substrate is a heat resisting alloy having an aggregate nickel plus chromium content greater than 20% by weight, the heat resisting alloy also exhibiting relatively high mechanical strength and thermal conductivity.

Dispersions of catalysts according to the process of the invention may be deposited upon supports by methods well known in the art. The support preferably has a first coating or layer, sometimes called a "washcoat", of an adherent coating containing oxygen, into which may be pumped a dispersion of the catalyst which may then be dried and calcined.

Preferably, the first coating or layer upon the support is a high surface area, catalytically active refractory metal oxide film, 0.0004 to 0.001 inch thick, containing, for example, one or more of alumina, silica, titania, zirconia, hafnia, thoria, berrylia, magnesia, chromia, or boria but may also comprise oxygen containing anions such as chromate, phosphate, silicate and nitrate.

An alternative metalllic support may be made from an alloy such as that described in U.S. Pat. Nos. 3,298,826 and 3,027,252 and consisting of an aluminium bearing ferritic steel which forms a surface layer of alumina on heating in air.

Steels falling within the scope of U.S. Pat. Nos. 3,027,252 and 3,298,826 include those having a composition by weight of a trace to 15% chromium, 0.5–12% aluminium, 0.1 to 3% yttrium and balance iron.

Any of the well-known methods may be used to apply the washcoat to the support. For example, if a ceramic support is used and the washcoat comprises a high surface area catalytically active refractory metal oxide, the washcoat may be applied by dipping the support into an aqueous suspension, dispersion or slurry of the refractory oxide, followed by drying and calcining. On the other hand, if a metallic support is used, the method of applying the washcoat will depend on the ingredients of the alloy. For example, if aluminium is present a surface layer of alumina may be provided by oxidising with a solution of an alkaline carbonate, usually a sodium carbonate chromate solution. Alternatively, an alumina layer may be provided by making the metal the anode in an electrolyte of, for example, sulphuric acid. If aluminium is not present in the support, or if it is not present in a quantity sufficient to form an alumina layer on oxidation, an aluminium coating may be applied by vapour deposition followed by anodising or heating in an oxygen-containing gas. This is the process known by the Trade Mark "Calorising".

For a ceramic or a metallic support, a surface area of at least 600 sq. ft. per cubic ft. of washcoated support is preferred. A water porosity ranging from 15–40% is suitable with 25% preferred. At least 10% of the micropores should have a diameter greater than 10 microns and 90% greater than 10 microns is preferred.

The second layer comprising one or more of the mixed oxides as defined above is deposited upon the oxygen containing coating or film integral with the substrate and may be deposited in a form which possesses catalytic activity or which is capable of being rendered catalytically active by subsequent treatment. We have found that catalytic structures according to this aspect of the present invention are extremely robust and effective in catalysing high temperature reactions such as the decomposition or reduction of nitric oxide.

Preferably, the quantity of mixed oxide of iron and cobalt to be deposited on a support is that which gives 10 grams of iron and cobalt (as metal) per cubic foot of support. Thus, one catalytic structure comprises an inert unitary porous refractory ceramic honeycomb having a first or intermediate coating of a high surface area catalytically active refractory metal oxide and a second layer deposited upon the said first layer and comprising at least 10% by weight of a mixed oxide as defined above.

The present invention also includes the catalyst described and used in the purification process described above.

The mixed oxides for use in the process of the present invention may be prepared by methods known in the art. Examples of mixed oxides according to the invention when prepared by one preparative method are given below.

The method used included two stages, the first stage involving hydroxide co-precipitation and the second stage involving dehydration of the first stage product in the form of a gel. In compositions of type (b) where $1 \leq x \leq 3$, the dehydration ws accompanied by air oxidation to form Co(III).

The equations of reaction are as follows:
A for the composition range $0 \leq x \leq 1$.
(1) hydroxide coprecipitation:

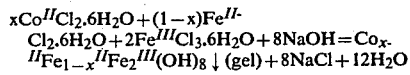

(2) dehydration of gel:

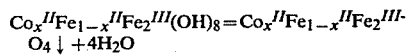

B for the composition range $1 \leq x \leq 3$.
(3) hydroxide coprecipitation:

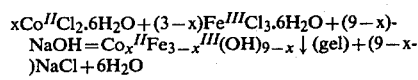

(4) dehydration oxidation of the gel:

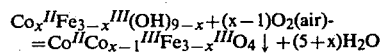

The method was as follows:
100 ml. solutions containing 0.15 M of metal ions were prepared by dissolving the appropriate amounts of metal chlorides according to (1) or (3) above in distilled de-aerated water. The mixed metal salt solution was then rapidly added with continual stirring to 50 ml. of de-aerated, freshly prepared 6 N NaOH solution at room temperature. The pH of the reaction mixture was measured by a Vibret pH meter (E.I.L. LTD.) The pH ranged from 8 for $x=0$ to about 11 for $x=3$ and was then adjusted to a value of 12.5 by further addition of 6 N NaOH from a burette. At this stage, the reaction mixture, which was in the form of a dark coloured gel, was dehydrated on a steam bath for an hour. On reaching 95° C., the reaction mixture became clear and a black powder—the spinel phase—precipitated. This precipitate was filtered and washed repeatedly with distilled water until it was free of alkali. It was then dried overnight at 100° C. and the resultant powder was crushed in an agate mortar.

The cobalt-iron oxides were analysed for total Co and Fe gravimetrically by using the zinc oxide separation method (R. S. Young, "Analytical Chemistry of Cobalt", (Pergamon Press, Oxford, 1965) p. 359). The concentration of $Co^{III}$ and $Fe^{II}$ were determined by the Smiltens method (J. Smiltens, J. Am. Chem. Soc., 79 (1957) 4881).

The surface area of the oxides was measured by the BET technique using nitrogen as the adsorbate at $-196°$ C. X-ray powder photographs were taken of all the oxides, using a Philips X-ray machine with a molybdenum target.

The nominal and actual compositions of seven mixed oxides prepared according to the above method are given in the following Table.

|     | Nominal composition | Actual composition |
| --- | --- | --- |
| i   | $Co_0Fe_3O_4$ | 91% $Co_0Fe_3O_4$ + 9% $Fe_2O_3$ |
| ii  | $Co_{0.6}Fe_{2.4}O_4$ | 94% $Co_{0.6}Fe_{2.4}O_4$ + 6% $Fe_2O_3$ |
| iii | $Co_{1.0}Fe_{2.0}O_4$ | ~99% $Co_{1.0}Fe_{2.0}O_4$ |
| iv  | $Co_{1.5}Fe_{1.5}O_4$ | ~99% $Co_{1.5}Fe_{1.5}O_4$ |
| v   | $Co_{2.0}Fe_{1.0}O_4$ | 95% $Co_{1.9}Fe_{1.1}O_4$ + 5% $Co_3O_4$ |
| vi  | $Co_{2.4}Fe_{0.6}O_4$ | 90% $Co_{2.3}Fe_{0.7}O_4$ + 10% $Co_3O_4$ |
| vii | $Co_{3.0}Fe_0O_4$ | ~99% $Co_{3.0}Fe_0O_4$ |

It will of course be appreciated that the above Table makes no mention of the oxidation states of the cobalt and iron, but these may readily be determined from the appropriate general formula for the mixed oxide. Thus composition (i) for example may be written as $Co_0$-$Fe^{II}Fe_2^{III}O_4$, (iii) as $Co^{II}Fe_2^{III}O_4$, (v) as $Co^{II}Co^{III}Fe^{III}O_4$ and so on.

Since both cobalt and iron hydroxides respectively, on dehydration-oxidation, form $Co_3O_4$, $Fe_3O_4$ and $\alpha$-$Fe_2O_3$, all of which possess the spinel structure, it follows that a solid solution of cobalt and iron hydroxides subjected to dehydration-oxidation would also possess the spinel structure, the composition being determined by the cobalt/iron ratio. The essential process step for the formation of a true solid solution is the simultaneous precipitation of cobalt and iron cations and this is achieved in the above preparative method by having a high initial pH. The co-precipitated hydroxides are capable of forming a solid solution because the ionic radii of the metal cations are similar, being 0.82 A for Co(II) and 0.83 A for Fe(II).

The variation of BET surface area with x is shown in FIG. 1 from which it will be seen that the surface area decreases with increasing cobalt content with the decrease becoming more rapid in the range $0 < x < 1$. Despite this decrease, however, the surface area is very high, varying from 125 to 60 $m^2g^{-1}$.

The variation in lattice parameter $a_o$ with the value of x, obtained from X-ray diffraction data, is shown graphically in FIG. 2, on which is shown also the literature values obtained by calculation. This confirms that true mixed Co-Fe oxides were formed and that, as Co replaces Fe in the spinel lattice, the unit cell decreased in size.

Data for the catalysed decomposition of nitric oxide was obtained for mixed oxides of iron and cobalt using the following reaction conditions:

A bed depth of 1 cm. and a bed diameter of 0.6 cm. was used. Weight of mixed oxide normally taken: 0.3–0.5 g. A reactant gas input of 100 $cm^3$ $mm^{-1}$ was used: 1000 ppm of NO in $N_2$. Space velocity at 600° C. was 33,000 $hr^{-1}$.

The activities of the mixed oxides with respect to NO decomposition are shown in FIG. 3.

It can be seen that the majority of peaks observed are associated with an NO adsorption/desorption process. The material where x=2 appears to be the most active catalyst, showing a NO dissociation peak at just below 400°.

Similar results to those referred to above have also been obtained where the catalyst material was supported on extended metal substrates of the type herein described.

What is claimed is:

1. A process for decomposing NO in air or other gaseous media containing the oxide which includes the step of contacting said air or other gaseous media with a supported catalyst comprising a mixed oxide selected from the group consisting of:
   (a) $Co_x^{II}Fe_{1-x}^{II}Fe_2^{III}O_4$ where x normally has values greater than 0 and up to 1 and,
   (b) $Co^{II}Co^{III}_{(x-1)}Fe^{III}_{(3-x)}O_4$ where x normally has values $1 \leq x \leq 3$, the catalyst support being a corrugated or extended metallic substrate or nichrome wire having deposited thereon a first layer, 0.0004 to 0.001 inch thick, comprising an adherent alumina coating.

2. A process according to claim 1, wherein x in part (a) is 0, 0.6 or 1.

3. A process according to claim 2 wherein x in part (b) is 1, 1.5, 2, 2.4 or 3.

4. A process according to claim 1, wherein the mixed oxide is:
$Co_{0.6}^{II}Fe_{0.4}^{II}Fe_2^{III}O_4$;
$Co^{II}Fe_2^{III}O_4$;
$Co^{II}Co_{0.5}^{III}Fe_{1.5}^{III}O_4$;
$Co^{II}Co^{III}Fe^{III}O_4$;
$Co^{II}Co_{1.4}^{III}Fe_{0.6}^{III}O_4$, or
$Co^{II}Co_{2.0}^{III}O_4$.

5. A process according to claim 1 wherein the support is a heat resistant alloy of iron including at least one of the elements (3–40 wt.%) chromium, (1–10 wt.%) aluminium, (a trace to 5 wt.%) cobalt, (a trace of 72 wt.%) nickel and (a trace to 0.5 wt.%) carbon.

6. A process according to claim 1, wherein the support is a heat resistant alloy having an aggregate nickel plus chromium content greater than 20 wt.%.

7. A process according to claim 1, wherein the catalyst material is dispersed within the said first layer.

8. A process according to claim 1, wherein the support is an aluminium bearing ferritic steel.

9. A process according to claim 8, wherein the aluminium bearing ferritic steel has the composition, apart from impurities, of chromium (trace to 15 wt.%), aluminium (0.5–12 wt), yttrium (0.1 to 3.0 wt.%) balance iron.

10. A process according to claim 8, wherein the support is heated in air to provide a surface coating of alumina.

* * * * *